United States Patent
Hughes

[11] Patent Number: 5,231,786
[45] Date of Patent: Aug. 3, 1993

[54] FISHING LURE

[75] Inventor: Gary L. Hughes, Houston, Tex.

[73] Assignee: Plastics Research and Development Corp., Fort Smith, Ark.

[21] Appl. No.: 899,271

[22] Filed: Jun. 16, 1992

[51] Int. Cl.⁵ .............................................. A01K 85/00
[52] U.S. Cl. ................................... 43/42.39; 43/42.4; 43/44.81
[58] Field of Search .................. 43/42.39, 42.4, 44.81, 43/42.45

[56] References Cited

U.S. PATENT DOCUMENTS

| | | | |
|---|---|---|---|
| 2,765,572 | 10/1956 | Woolfe | 43/44.39 |
| 3,803,747 | 4/1974 | Cartwright | 43/44.81 |
| 3,990,171 | 11/1976 | Davis | 43/42.4 |
| 4,713,907 | 12/1987 | Dudeck | 43/42.39 |
| 4,887,378 | 12/1989 | Sheehan et al. | 43/42.4 |
| 4,945,669 | 8/1990 | Weble | 43/44.39 |
| 5,092,073 | 3/1992 | Kaecker | 43/42.39 |

Primary Examiner—Mark Rosenbaum
Assistant Examiner—Chuck Y. Mah
Attorney, Agent, or Firm—Veal & Associates

[57] ABSTRACT

In accordance with an illustrative embodiment of the present invention, a jig-type fishing lure includes a weighted body through which the lower portion of the shank of a hook extends in a manner such that the eye of the hook is inset in the front nose of the body. The weight of the body is distributed in a manner such that there is a righting moment which stands the lure up in the event it is positioned on its back. The inset of the eye makes the lure more snag-free, and the stand-up feature presents a more realistic appearance to a trailer bait mounted on the hook.

6 Claims, 1 Drawing Sheet

FISHING LURE

FIELD OF THE INVENTION

This invention relates generally to a fishing lure, and particularly to a jig-type lure that is relatively snag-free and which automatically rights itself when tipped rearward on bottom.

BACKGROUND OF THE INVENTION

Fishing lures that are jerked up and down or while being drawn through the water are commonly known as jigs. Such movement attracts a fish to strike at the lure and become hooked. One type of jig which has been used includes a body or head having an eye that protrudes from its front end and to which the line is tied, and an upwardly extending hook that is rigidly attached to the rear portion of the body. A bundle of bristles can be mounted on the body in front of and in longitudinal alignment with the hook to provide a weed guard that helps in preventing the hook from hanging up in various underwater plant life. A trailing artificial bait can be mounted on the hook to provide a realistic appearance that should attract more fish and result in more strikes. Such jigs typically are used to fish for bass in fresh water.

Prior jigs of the type described have suffered from a number of shortcomings. For example the body is molded around a bent section of the shank of the hook in a manner such that the eye of the hook sticks out in front of the body. This construction tends to hang up in grass and weeds in a highly undesirable manner. Another problem with prior designs is that such jigs will not stand up on bottom so that any artificial or other bait that is mounted on the hook as a trailer lays on the bottom and is not attractive to fish. Thus the number of strikes that are obtained is greatly reduced.

An object of the present invention is to provide a new and improved jig having the weight of the body distributed in a manner such that the jig stands up to provide a more realistic appearance for bait mounted on the hook thereof.

Another object of the present invention is to provide a new and improved jig where the eye of the hook to which the line is attached is inset in the front nose of the body to reduce the likelihood of hang-ups.

SUMMARY OF THE INVENTION

These and other objects are attained in accordance with the concepts of the present invention through the provision of a jig-type fishing lure having a weighted body that is molded on the lower end portion of the shank of a hook. The eye of the hook is positioned so that it is inset in the front nose of the body to provide a passage through which the line can be extended and then knotted to secure the jig to the line. The body is shaped and dimensioned in a manner such that there is a righting moment about the rear portion of the body when the body is tipped rearward and the shank of the hook is laying substantially horizontal. This moment causes the jig to automatically stand up and provide a realistic appearance to any bait that is mounted on the hook, which attracts more fish and results in more strikes. The inset of the eye of the hook within the front nose of the body reduces hang-up in weeds and grass as the lure is reeled in.

BRIEF DESCRIPTION OF THE DRAWINGS

The present invention has other objects, features and advantages as will become more clearly apparent in connection with the following detailed description of a preferred embodiment, taken in conjunction with the appended drawings in which.

DETAILED DESCRIPTION OF A PREFERRED EMBODIMENT

Figure 1:
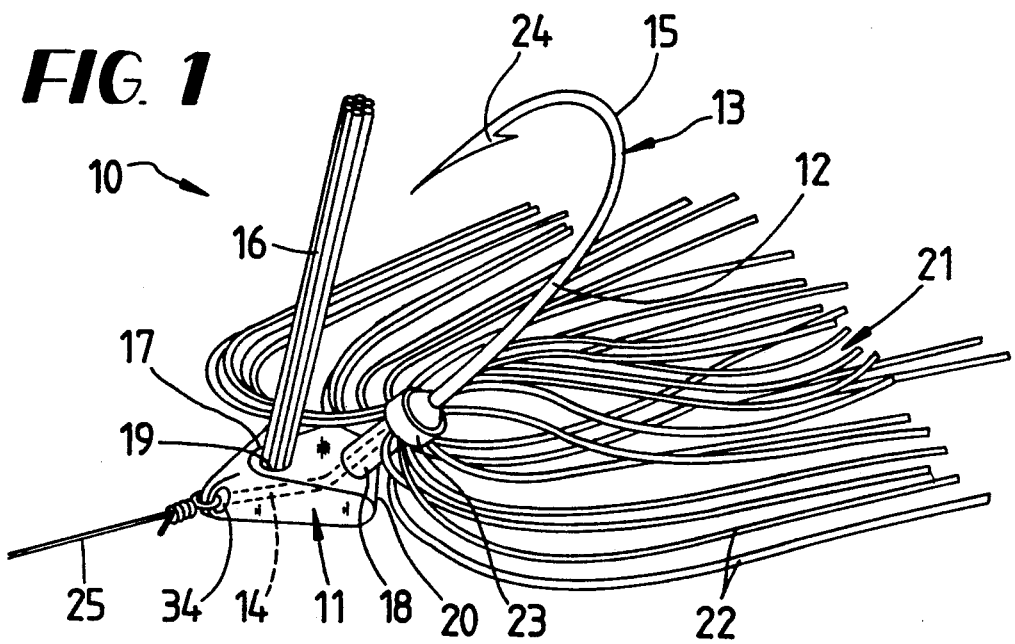
FIG. 1 is an isometric view of the jig of the present invention.

Referring initially to FIG. 1, a jig-type fishing lure 10 that is constructed in accordance with the principles of the present invention includes a body 11 which has a lower portion 14 (phantom lines) of the shank 12 of a hook 13 embedded therein. The body 11 can be made of lead to provide adequate weight. The body 11 preferably is molded around the lower portion 14 of the shank 12. The bight 15 of the hook 13 curves forward to the barb 24, as shown, so that the plane of the hook coincides with a vertical plane through the longitudinal axis of the body 11. Also located generally in such plane is a weed guard 16 which can be in the form of a bundle of bristles having its lowered end captured in an aperture 19 in the upper portion 17 of the body 11. The top of the bundle 16 preferably is located just above the barb 24 of the hook 13 to ward off the branches and trunks of weeds or debris that typically are found near a shoreline, thereby preventing the hook 13 from hanging up.

The lower portion 14 of the shank 12 extends out of the body 11 through a neck 18 that is formed integrally with the rear portion 20 of the body. A shoulder 27 can be formed on the outer end of the neck 18. A skirt 21, which can take numerous forms, is shown as including a plurality of elastomer strips 22 having their center portions positioned around the outer periphery of the neck 18 and secured by a rubber band 23 or the like. If desired, the strips 22 can have vari-colored glitter particles embedded therein. As shown in FIG. 1, when the jig 10 has been jerked forward and then comes to rest on the bottom and assumes its upright position, the strips 22 tend to spread out in a fan shape toward the rear and thereby obstruct the view of the body 11, the neck 18, the lower part of the shank 12 and band 23.

Figure 2:
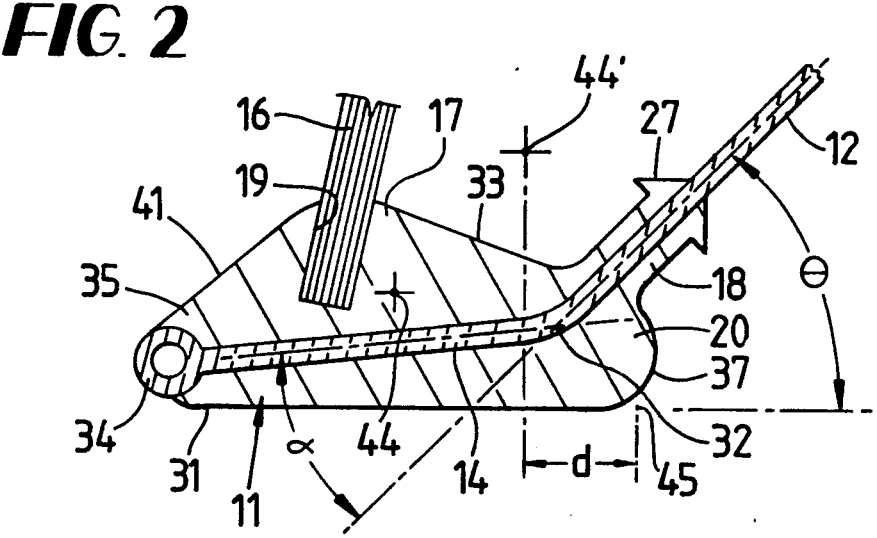
FIG. 2 is an enlarged side section view of the body of the jig shown in FIG. 1.

Referring now to FIG. 2, a vertical section through the body 11 illustrates how it is molded around the lower portion 14 of the shank 12 of the hook 13. In the embodiment shown, the angle θ between the axis of the shank 12 and the plane of the bottom surface 31 of the body 11 is about 45°, although other angles can be used. At a point 32 below the upper surface 33 of the body 11, the shank 14 is bent through an angle of about 30°–40° so that the eye 34 of the hook 13 is inset into the front nose 35 of the body. Although the central axis of the hook eye 34 is shown as being transverse to the longitudinal axis of the body 11, it could be located in other orientations, for example the vertical.

Figure 3:
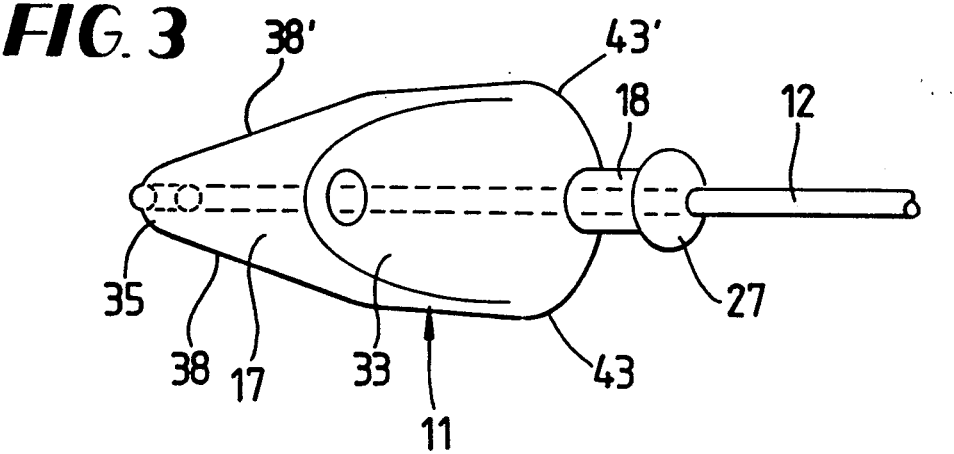
FIG. 3 is a top view of the body of the jig shown in FIG. 2.

The body 11 preferably is formed with a substantially flat upper surface 33 that includes downward and rearward to a curved rear surface 37. As shown in FIG. 3, the front portion of the body 11 is generally wedge-shaped and has substantially flat side walls 38, 38' which converge toward the nose 35. As shown in FIG. 2, the upper peripheral outline 41 of the nose 35 includes forward and downward to give the body 11 a favorable hydro-dynamic shape as it is pulled through the water. As noted above, the bottom surface 31 of the body 11 is substantially flat and has a "teardrop" general overall shape with rounded corners 43, 43' at its rear.

With further reference to FIG. 2, the body 11 is shaped and arranged to have a center of gravity approximately at the point 44. The point 44 is located in a manner such that when the jig 10 is tipped over backward so that the shank 12 is horizontal, there is a righting moment about the rear edge of the bottom surface 31. Such righting moment can be approximately as the product of the weight of the body 11 and the distance d measured horizontally between point 45 near the heel surface 37 and the point 44' which is the tilted position of the center of gravity point 44. Such righting moment causes the jig 10 to tilt forward and stand up in the orientation shown in FIGS. 1 and 2. Although not shown, the jig 10 can be used with a trailer bait on the hook 13, such as a plastic crawfish, a pork rhine, or the like.

OPERATION

In use, the outer end of a fishing line 25 is passed through the eye 34 and then knotted in an appropriate manner. The jig 10 then is cast into a region of the water where fish are thought to be present. The jig 10 sinks to the bottom, and, if it happens to land on its back as described above, it will immediately right itself so that any trailer bait that is used will present a realistic appearance which will invite a strike. If no strike is obtained after a reasonable time, then the line 25 is jerked to cause the jig 10 to advance a short distance toward the boat and attract attention. Hereagain if the jig 10 comes to rest on the water bottom on its back, then it will immediately right itself. Since the eye 34 is inset into the nose 35 of the body 11, there is much less tendency for the jig to hang up in grass or weeds, as compared to constructions where the eye protrudes or sticks out from the nose of the jig's body. Thus the present invention operates substantially weedless and snag-free.

The skirt 21 can be removed by simply removing the elastic band 23 and replaced, if desired, with a skirt having a different appearance. Of course the jig 10 can be used with or without trailer bait.

It now will be recognized that a new and improved jig-type fishing lure has been disclosed. Since certain changes or modifications may be made in the disclosed embodiment without departing from the inventive concepts involved, it is the aim of the appended claims to cover all such changes and modifications falling within the true spirit and scope of the present invention.

What is claimed is:

1. A fishing lure comprising, a wedge shaped body having a substantially flat bottom surface and a heel portion defined rearwardly of said bottom surface, and a hook having a shank extending through said body and extending upwardly and rearwardly at an angle with respect to said bottom surface and an eye partially embedded within and extending forwardly of said body with said body diverging from said eye rearwardly; said body having a center of gravity that is located intermediate said heel portion and said eye to produce a forward righting moment about said heel portion when said body and hook are tilted rearward which causes said body and hook to return to their upright position.

2. The lure of claim 1 further including weed guard means anchored in said body and arranged in longitudinal alignment and in front of said hook.

3. The lure of claim 2 wherein said weed guard means comprises a bundle of plastic bristles having their lower ends embedded in said body.

4. The lure of claim 1 wherein said shank extends into said body through a neck which extends rearward of said heel portion, and further including skirt means removably attached to said neck.

5. The lure of claim 4 wherein said skirt means comprises a plurality of flexible elastomer strips; and elastic band means on said neck and encircling said strips for retaining said strips on said neck.

6. A fishing lure comprising: a body having a nose portion and a heel portion; a hook having a lower portion of its shank extending into said body adjacent said heel portion, said lower portion extending through said body to said nose portion; said lower portion of said shank being terminated by an eye which extends forwardly of said nose portion, said eye having an opening to allow a line by which said lure is cast to be tied thereto, said nose portion diverging laterally and upwardly from said eye toward said heel portion, said body having a center of gravity located rearwardly of said eye which produces a forward righting moment about said heel portion.

* * * * *